Nov. 28, 1944.                G. B. SAYRE                2,363,808
    UNSCREWING DEVICE FOR THE MOLDING OF THREADED ARTICLES
               Filed April 19, 1940         2 Sheets-Sheet 1

INVENTOR
GORDON B. SAYRE
BY James + Franklin
ATTORNEY

Nov. 28, 1944.   G. B. SAYRE   2,363,808
UNSCREWING DEVICE FOR THE MOLDING OF THREADED ARTICLES
Filed April 19, 1940   2 Sheets-Sheet 2
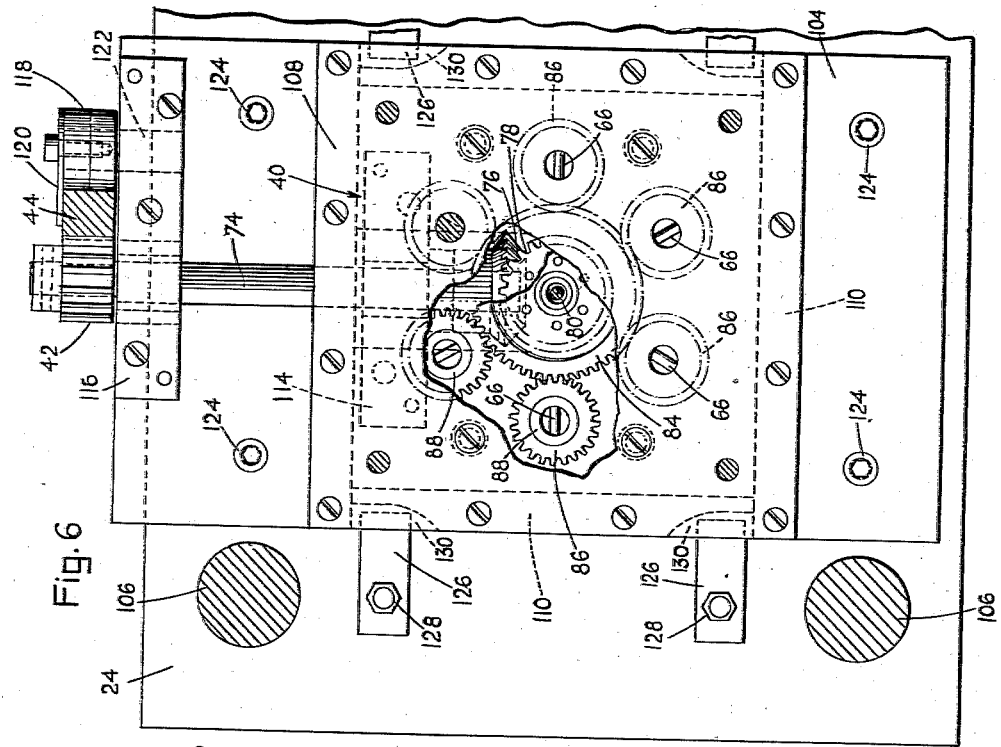
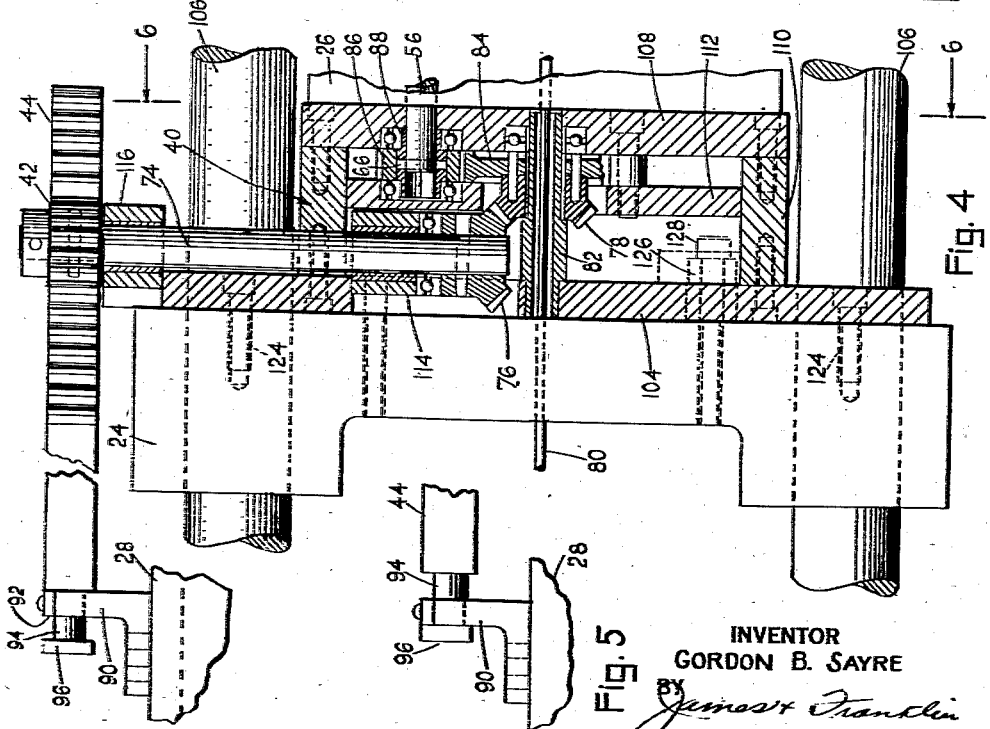
INVENTOR
GORDON B. SAYRE
BY
ATTORNEY Patented Nov. 28, 1944

2,363,808

UNITED STATES PATENT OFFICE 2,363,808

UNSCREWING DEVICE FOR THE MOLDING OF THREADED ARTICLES

Gordon B. Sayre, Boonton, N. J., assignor to Boonton Molding Company, Boonton, N. J., a corporation of New Jersey Application April 19, 1940, Serial No. 330,494

24 Claims. (Cl. 18—16)

This invention relates to molding apparatus, especially for the molding of plastics, and more particularly for the molding of threaded articles.

The primary object of my invention is to generally improve molding machinery. A more particular object is to provide an unscrewing device for automatically unscrewing a threaded mold part from a molded article formed thereagainst. Still another object is to provide an unscrewing device which obtains its driving power from the opening movement of the die, thereby properly synchronizing the operation of the unscrewing device with the die.

Still another object of my invention is to provide an unscrewing device which is adapted for use with a standard form of injection molding machine having a center gate and a plurality of mold cavities disposed radially around the gate. Still another object is to provide lost motion in the operation of the unscrewing device such that the die will be partly opened before the unscrewing device begins operation, thereby distributing and lessening the load on the mechanism which opens the die. Still another object is to provide adequate lost motion to accommodate movement of the cover die, as well as the ejector die, in order to break the gate at the injection nozzle.

Further objects of my invention are to provide an unscrewing mechanism carried in a relatively flat housing adapted to fit neatly between the movable head of a molding press and the ejector die; an unscrewing mechanism which may be used with many different dies; an unscrewing mechanism which is adapted for use on almost any of the standard injection molding machines; and finally, an unscrewing device which does not interfere with the normal ejector pin location, mounting and operation.

To the accomplishment of the foregoing, and such other objects as will hereinafter appear, my invention consists in the molding and unscrewing elements and their relation one to the other, as hereinafter are more particularly described in the specification, and sought to be defined in the claims. The specification is accompanied by drawings, in which:

Fig. 4 illustrates a fragmentary portion of the molding apparatus with the unscrewing device shown in section;

Fig. 5 is explanatory of a feature of the invention; and

Fig. 6 is a transverse section through the press taken approximately in the plane of the line 6—6 of Fig. 4 with a part of the top plate of the unscrewing device cut away to expose the gearing therebeneath.

Figure 1:
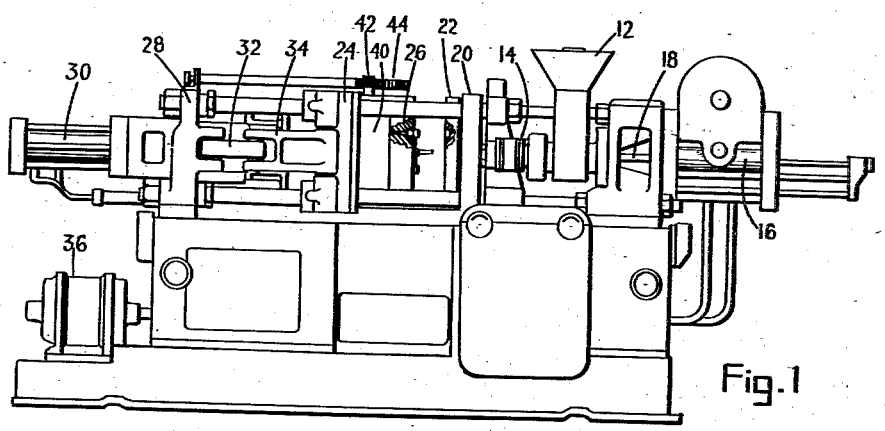
Fig. 1 is a front elevation of a standard molding machine equipped with an unscrewing device embodying features of my invention.

Referring to the drawings, and more particularly to Fig. 1, the molding apparatus there shown happens to be a "Reed-Prentice injection molding machine." In common with most injection molding machines, it comprises a hopper 12 for the reception of the molding material, a heating cylinder 14 for heating the molding material as it is compressed and moved toward the nozzle, a hydraulic cylinder 16 for operating the plunger 18, a front die plate 20 on which a cover die 22 is mounted, a movable die plate 24 on which an ejector die 26 is mounted, and a stationary head 28 which, in the present case, carries an hydraulic cylinder 30 for opening and closing the die.

The precise mechanism used for the various movements is unimportant to the present invention. For example, in the present case the cylinder 30 does not act directly on the movable head 24, and instead acts indirectly through appropriate toggle linkage 32, 34, but that is of no consequence to the present invention, it being sufficient that there be a movable head for carrying the movable part of the die in order to open and close the same. A motor 36 drives a suitable pump acting as a local source of hydraulic power.

In accordance with the present invention, an unscrewing device 40 is mounted directly between the ejector die 26 and the movable head 24. The mechanism of the unscrewing device is housed in a relatively extensive flat casing which is adapted for this type of mounting. The gearing of the unscrewing device terminates in a pinion 42 meshing with a rack 44, the latter being mounted on a stationary part of the apparatus as, for example, the cylinder plate 28.

Figure 2:
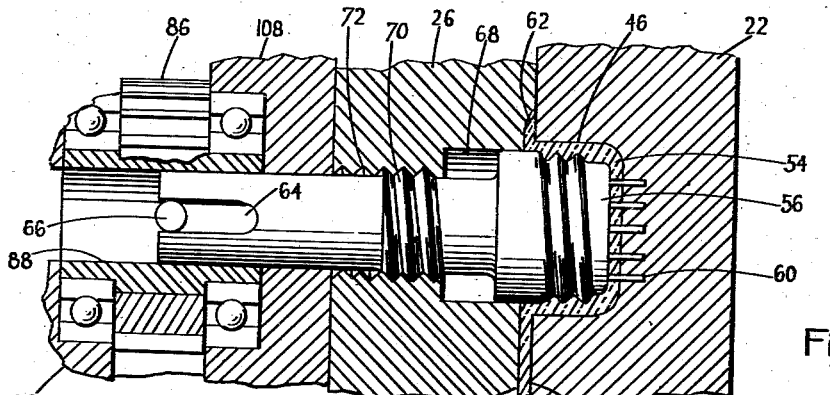
Fig. 2 is a section drawn to enlarged scale through a fragmentary portion of a mold, and shows the relation between the mold and the parts of the unscrewing device.

Referring now to Fig. 2, a mold cavity in the cover die 22 is indicated at 46. This is supplied with molding material from a nozzle 48, the molding material flowing through a conventional divergent gate passage 50, and thence through a radial gate passage 52. The article being made in this instance is a perforated cap 54 for a shaker for table use, such as an ordinary salt shaker. The interior of the cap is formed with a thread which enables it to be screwed on to the threaded neck of the shaker. The thread is molded against a threaded core 56.

Figure 3:
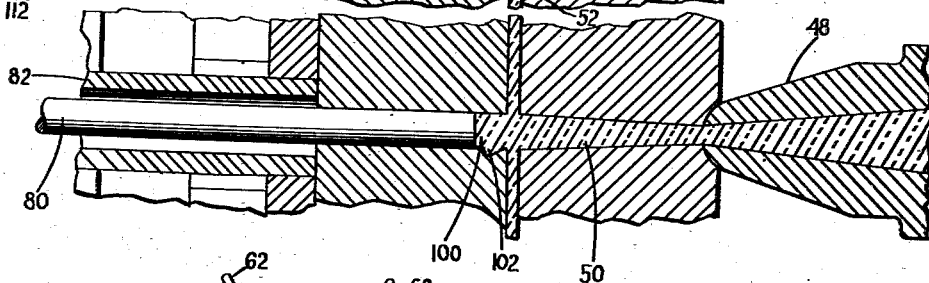
Fig. 3 is explanatory of a typical gate arrangement for a mold used with the unscrewing device as here disclosed.

Referring now to Fig. 3, a plurality of threaded articles may be formed during each molding operation. In the present case the unscrewing device is provided with six spindles for use with molds having six cavities. These are distributed uniformly about the central gate 50, and are connected thereto by means of radial gates 52. The items may differ from one another. There may, for example, be imperforate bottle caps 58, as well as perforated shaker caps 54. If the perforations for the latter are to be formed during the molding operation, as is preferably the case, the cover die 22 (Fig. 2) is provided with appropriately distributed pins 60 for forming the perforations. The molded caps are held against rotation by the gate arms 52, as well as pins 62, and it is, therefore, necessary to unscrew the core pin from the cap. Gate extensions 62 may, if desired, be provided on the outside of the caps in order to additionally restrain the caps from rotation.

Reverting now to Fig. 2, the inner end of the core pin is slotted at 64 for cooperation with a suitable driving key 66. The arrangement is such that the core pin is afforded its necessary axial movement as it is rotated by key 66. The cover die 26 is appropriately hollowed at 68 to receive the core as it is unscrewed from the cap.

While not theoretically essential, I believe it highly desirable as a practical matter to insure proper axial movement of the core pin by means of a thread independent of that formed in the molded article. This not only places less strain on the freshly molded article, but even more importantly, definitely fixes the axial location of the core pin during the molding operation, and dispenses with conventional core pins connected to a conventional core plate for the same purpose. In the present case, I provide a thread 70 on the intermediate portion of the core pin, said thread cooperating with a thread 72 formed in the movable die 26. Thread 70 is short enough to allow for the necessary axial movement. This thread may have any convenient diameter, but its pitch must be identical with the pitch of the thread formed in the molded article.

Referring now to Figs. 4 and 6 of the drawings, pinion 42 is secured on the upper end of a shaft 74 projecting vertically upward from the housing 40 of the unscrewing device. The lower end of shaft 74 carries a bevel gear 76 meshing with a bevel gear 78 located at the center or axis of the apparatus, that is, coaxially with the main ejector pin 80 which is, as usual, aligned with divergent gate 50 (Fig. 2). The bevel gear 78 is carried on a shaft 82 which is preferably made hollow or tubular in order to freely receive the ejector pin 80. Bevel gear 78 is locked to a spur gear 84 which functions as a sun gear meshing with a plurality of planet gears or pinions 86, one for each core pin. This will be clear from inspection of Fig. 6 in which it will be seen that six equally spaced planet gears 86 mesh with the sun gear 84. The planet gears 86 are carried on hollow or tubular shafts 88, and are each provided with a transverse key or pin 66, previously referred to as engaging the slotted ends of the core pins. With this construction it will be evident that movement of the movable head 24 to open the die causes movement of pinion 42 along rack 44 and consequent rotation of all of the gears in the unscrewing device. The direction of rotation is properly selected to unscrew the core pins from the molded articles. When the die is closed, the core pins are screwed back to initial position.

I find that it is highly desirable to provide for lost motion in the movement of the die before the unscrewing device begins to function. One advantage is to distribute and lessen the load on the mechanism moving the movable head, so that it will not have to wrench the die open and at the same time unscrew the cores. Instead, the die is first opened with only the normal opening load needed to break the gate and to extract the molded pieces from the cover die. Only thereafter, and when the opening die has acquired some initial momentum, is the load of the unscrewing device added. Another advantage is that the unscrewed threaded cores help insure withdrawal of the molded piece from the cover die. Moreover, it is customary with injection molding machines to so mount the cover die as to permit a slight initial movement of the same with the ejector die. This is done in order to separate the cover die from the nozzle and thereby break the gate at the nozzle, thus admitting air and facilitating separation of the molded piece from the cover die when the cover die is stopped while the ejector die continues its opening movement.

For the above reasons, I provide substantial lost motion before operation of the unscrewing device begins. The lost motion should be adequate to take care of the initial movement of the cover die, and at least some additional separating movement between the cover die and the ejector die. In ordinary installations the lost motion should be at least one-half inch.

Referring to Figs. 4 and 5 of the drawings, a very simple way to provide the desired lost motion is to permit the rack 44 to reciprocate relative to the stationary head 28 and bracket 90 mounted thereon. Specifically, the bracket 90 is made in the form of a bearing having a bearing cap 92, and a slidable part 94 of rack 44 is received within the bearing. The motion is limited by a suitable head 96. In Fig. 4 the rack is shown in its leftward position which it assumes during opening movement of the die. In Fig. 5, the rack is shown in its rightward position which it assumes during closing movement of the die. It will be evident that the amount of lost motion may be adjusted by simply varying the length of the slidable portion 94 of the rack. Toward the completion of the opening movement of the die, the ejector pin 80 is operated in conventional manner, it abutting an appropriate stationary part of the machine, while the die continues to move.

Referring to Fig. 2, it will be seen that the resulting relative movement of the ejector pin 80 forces the gate extension 100 out of the ejector die, thereby releasing the entire molded piece (such as that shown in Fig. 3), and permitting it to fall gravitationally downward from the die. The gate extension 100 is provided to increase the adhesion of the gate to the ejector die in order to insure the removal of the divergent gate portion 50 from the cover die when the die is open. To further insure this desired result, the gate extension 100 may, if desired, be undercut as shown at 102. The force of the ejector pin 80 is adequate to overcome the resistance caused by undercut 102.

While the details of the housing of the unscrewing device are relatively unimportant, it may be briefly stated that there is a large extensive back plate 104 (Figs. 4 and 6) which fits between the tie bars 106 of the press in horizontal direction, but which extends for substantially the full height of the movable head 24 of the press in vertical direction. The housing further comprises a front plate 108 which is dimensioned to fit within the tie bars 106, and which is adapted to receive the movable or ejector portion of the mold. The plates 104 and 108 are spaced apart by suitable side walls 110. These also enclose an intermediate plate 112 (Fig. 4) which supports the inner bearings of the six planet gears 86. The shaft of the sun gear is held in the main plates 104 and 108. The vertical shaft 74 is supported in a lower bearing 114 located within the housing, and an upper bearing 116 carried near the upper edge of the back plate 104. The back plate is extended upwardly in order to provide the bearing 116 at a point near pinion 42 and rack 44. This bearing also carries an anti-friction guide roller 118 (Fig. 6) which holds the rack 44 in mesh with pinion 42. A finger 120 may, if desired, be fixedly secured at the upper end of the shaft 122 of roller 118 in order to hold the rack 44 against upward movement.

The enlargement of the back plate 104 facilitates mounting of the unscrewing device on the movable head 24. This may be done by means of screws 124 passing through plate 104 into movable head 24. If desired, the unscrewing device may be additionally secured on the movable head by means of clamps 126 held by screws 128, the side wall 110 of the housing being cut away at 130 to receive the ends of clamps 126.

It is believed that the construction and operation, as well as the many advantages of my improved unscrewing device for molding presses will be apparent from the foregoing detailed description thereof. It will be understood that the unscrewing device may be built for a smaller or larger number of mold cavities, and that these need not necessarily be arranged radially as shown. The drive for the unscrewing device is preferably obtained as a result of movement of the die, but it need not necessarily be effectuated by a rack and gear mechanism, as specifically disclosed. It will, therefore, be apparent that while I have shown and described my invention in a preferred form, many changes and modifications may be made in the structure disclosed without departing from the spirit of the invention as sought to be defined in the following claims.

In the claims the reference to a threaded "core" is not intended to exclude a mold part which forms an outside instead of an inside thread as, for example, the thread on a molded plug, instead of a cap. The claims are intended to include any threaded mold part of this general character. The reference in the claims to the inner end of the core being "slotted for cooperation with a driving key" is intended to include any suitable form of splining or similar non-rotatable coupling. The reference to "hollow shafts" for the planetary gears is intended to include any form of sleeve or hollow hub of the gear itself, adapted to slideably but non-rotatably receive the inner end of the core.

I claim:

1. In combination, a molding press, a cover die, a movable die, a core rotatably mounted in the movable die, said core having a threaded molding surface, a thread on said core intermediate its ends and cooperating with a thread in the die, the pitch of said intermediate thread being the same as the pitch of the thread to be molded, and means responsive to movement of the movable die for rotating said core and thereby unscrewing the core from the molded piece as the die opens, said means comprising a rack mounted on the molding press, a gear movable with said movable die and meshing with said rack, and means coupling said gear to the core for rotating the same.

2. In combination, a molding press, a cover die, a movable die, a core rotatably mounted in the movable die, said core having a threaded molding surface, and mechanism responsive to movement of the movable die for rotating said core and thereby unscrewing the core from the molded piece as the die opens, said means comprising a rack mounted on the molding press, a gear carried by said movable die and meshing with said rack, means coupling said gear to the core, and means to provide lost motion in the operation of said mechanism in order to permit initial opening of the die before the core begins to unscrew.

3. In combination, a molding press, a cover die, a movable die, a core rotatably mounted in the movable die, said core having a threaded molding surface, the inner end of said core being slotted for cooperation with a driving key, a thread on said core intermediate its ends and cooperating with a thread in the die, the pitch of said intermediate thread being the same as the pitch of the thread to be molded, and means responsive to movement of the movable die for rotating said core and thereby unscrewing the core from the molded piece as the die opens, said means comprising a rack secured to a stationary part of the molding press, a gear carried by said movable die and meshing with said rack, and means coupling said gear to the core, said rack being connected to said press, with a lost motion connection to permit partial opening of the die before the core begins to unscrew.

4. A molding machine comprising a cover die, a movable die plate, an ejector die carried thereby, unscrewing mechanism disposed between the ejector die and the movable die plate, a plurality of threaded cores carried by said ejector die, each core being threaded at its outer end, and slotted at its inner end for cooperation with a driving key, and a relatively stationarily mounted gear rack extending in the direction of movement of the die, said unscrewing mechanism including a plurality of hollow shafts keyed to receive the slotted ends of the cores, gearing interconnecting said shafts for simultaneous rotation, and a gear meshing with the rack and so coupled to the aforesaid gearing that opening of the die with consequent relative movement of the gear and rack unscrews the cores.

5. A molding machine comprising a cover die, a movable die plate, an ejector die carried thereby, unscrewing mechanism housed in a relatively flat housing disposed between the ejector die and the movable die plate, a plurality of threaded cores carried by said ejector die, each core being threaded at its outer end, and slotted at its inner end for cooperation with a driving key, and a gear rack extending in the direction of movement of the die and secured with a substantial lost-motion connection to a stationary part of the molding machine, said unscrewing mechanism including a plurality of hollow shafts keyed to receive the slotted ends of the cores, gearing interconnecting said shafts for simultaneous rotation, and a gear meshing with the rack and so coupled to the aforesaid gearing that opening of the die unscrews the cores.

6. A molding machine comprising a cover die, a movable die plate, an ejector die carried thereby, unscrewing mechanism disposed between the ejector die and the movable die plate, a plurality of threaded cores carried by said ejector die, each core being threaded at its outer end, and slotted at its inner end for cooperation with a driving key, and threaded intermediate its ends to mate with a thread in the die, said intermediate thread having a pitch equal to the thread to be molded, and a relatively stationarily mounted gear rack extending in the direction of movement of the die, said unscrewing mechanism including a plurality of hollow shafts keyed to receive the slotted ends of the cores, gearing interconnecting said shafts for simultaneous rotation, and a gear meshing with the aforesaid rack and so coupled to the aforesaid gearing that opening of the die with consequent relative movement of the gear and rack unscrews the cores.

7. A molding machine comprising a cover die, a movable die plate, an ejector die carried thereby, unscrewing mechanism housed in a relatively flat housing disposed between the ejector die and the movable die plate, a plurality of threaded cores carried by said ejector die, each core being threaded at its outer end, and slotted at its inner end for cooperation with a driving key, and threaded intermediate its ends to mate with a thread in the die, said intermediate thread having a pitch equal to the thread to be molded, and a gear rack extending in the direction of movement of the die and secured with a substantial lost-motion connection to a stationary part of the molding machine, said unscrewing mechanism including a plurality of hollow shafts keyed to receive the slotted ends of the cores, gearing interconnecting said shafts for simultaneous rotation, and a gear meshing with the aforesaid rack and so coupled to the aforesaid gearing that opening of the die unscrews the cores.

8. A molding machine for the molding of plastics, said molding machine comprising a nozzle, a front die plate, a cover die so mounted thereon as to permit movement of the cover die relative to the nozzle in order to break the gate at the nozzle, a movable die plate, an ejector die carried thereby, unscrewing mechanism disposed between the ejector die and the movable die plate, a plurality of mold cavities disposed around a gate in the cover die, a plurality of threaded cores carried by said ejector die, each core being threaded at its outer end, and slotted at its inner end for cooperation with a driving key, and a gear rack extending in the direction of movement of the die and secured with a substantial lost-motion connection to a stationary part of the molding machine, said unscrewing mechanism including a plurality of hollow shafts keyed to receive the slotted ends of the cores, gearing interconnecting said shafts for simultaneous rotation, and a gear meshing with the aforesaid rack and so coupled to the aforesaid gearing that opening of the die unscrews the cores, the lost motion of the rack being adequate to permit breakage of the gate at the nozzle and partial opening of the die before the cores begin to unscrew.

9. An injection molding machine for the molding of plastics, said machine comprising a cover die, a movable die plate, an ejector die carried thereby, unscrewing mechanism disposed between the ejector die and the movable die plate, a plurality of mold cavities disposed radially around a gate, a plurality of threaded cores carried by said ejector die, each core being threaded at its outer end and slotted at its inner end for cooperation with a driving key, said unscrewing mechanism including a sun gear coaxial with the gate, planet gears around said sun gear coaxial with the cores, the shaft of said sun gear being hollow to receive an ejector pin, the shafts of said planet gears being hollow and keyed to receive the slotted ends of the cores, and means responsive to movement of the movable die plate for rotating the sun gear.

10. An injection molding machine for the molding of plastics, said machine comprising a cover die, a movable die plate, an ejector die carried thereby, unscrewing mechanism housed in a relatively flat housing disposed between the ejector die and the movable die plate, a plurality of mold cavities disposed radially around a gate, a plurality of threaded cores carried by said ejector die, each core being threaded at its outer end, and slotted at its inner end for cooperation with a driving key, and a gear rack extending in the direction of movement of the die and secured to a stationary part of the molding machine, said unscrewing device including a sun gear coaxial with the gate, planet gears around said sun gear coaxial with the cores, the shaft of said sun gear being hollow to receive an ejector pin, the shafts of said planet gears being hollow and keyed to receive the slotted ends of the cores, and a gear meshing with the aforesaid rack and so coupled to the sun gear that opening of the die unscrews the cores.

11. An injection molding machine for the molding of plastics, said machine comprising a cover die, a movable die plate, an ejector die carried thereby, unscrewing mechanism disposed between the ejector die and the movable die plate, a plurality of mold cavities disposed radially around a gate in the cover die, a plurality of threaded cores for said cavities, each core being threaded at its outer end, and slotted at its inner end for cooperation with a driving key, and threaded intermediate its ends to mate with a thread in the die, said intermediate thread having a pitch equal to the thread to be molded, and a gear rack extending in the direction of movement of the die and secured to a stationary part of the molding machine, said unscrewing device including a sun gear coaxial with the gate, planet gears around said sun gear coaxial with the cores, the shaft of said sun gear being hollow to receive an ejector pin, the shafts of said planet gears being hollow and keyed to receive the slotted ends of the cores, and a gear meshing with the aforesaid rack and so coupled to the sun gear that opening of the die unscrews the cores.

12. An injection molding machine for the molding of plastics, said machine comprising a cover die, a movable die plate, an ejector die carried thereby, unscrewing mechanism housed in a relatively flat housing disposed between the ejector die and the movable die plate, a plurality of mold cavities disposed radially around a gate in the cover die, a plurality of threaded cores carried by said ejector die, each core being threaded at its outer end, and slotted at its inner end for cooperation with a driving key, and a gear rack extending in the direction of movement of the die and secured with a substantial lost-motion connection to a stationary part of the molding machine, said unscrewing device including a sun gear coaxial with the gate, planet gears around said sun gear coaxial with the cores, the shaft of said sun gear being hollow to receive an ejector pin, the shafts of said planet gears being hollow and keyed to receive the slotted ends of the cores, and a gear meshing with the aforesaid rack and so coupled to the sun gear that opening of the die unscrews the cores.

13. An injection molding machine for the molding of plastics, said machine comprising a cover die, a movable die plate, an ejector die carried thereby, unscrewing mechanism disposed between the ejector die and the movable die plate, a plurality of mold cavities disposed radially around a gate in the cover die, a plurality of threaded cores carried by said ejector die, each core being threaded at its outer end, and slotted at its inner end for cooperation with a driving key, and threaded intermediate its ends to mate with a thread in the die, said intermediate thread having a pitch equal to the thread to be molded, and a gear rack extending in the direction of movement of the die and secured with a substantial lost-motion connection to a stationary part of the molding machine, said unscrewing device including a sun gear coaxial with the gate, planet gears around said sun gear coaxial with the cores, the shaft of said sun gear being hollow to receive an ejector pin, the shafts of said planet gears being hollow and keyed to receive the slotted ends of the cores, and a gear meshing with the aforesaid rack and coupled by appropriate bevel gearing to the sun gear, whereby opening of the die unscrews the cores.

14. An injection molding machine for the molding of plastics, said machine comprising a nozzle, a front die plate, a cover die so mounted thereon as to permit movement of the cover die relative to the nozzle in order to break the gate at the nozzle, a movable die plate, an ejector die carried thereby, unscrewing mechanism housed in a relatively flat housing disposed between the ejector die and the movable die plate, a plurality of mold cavities disposed radially around a gate in the cover die, a plurality of threaded cores carried by said ejector die, each core being threaded at its outer end, and slotted at its inner end for cooperation with a driving key, and a gear rack extending in the direction of movement of the die and secured with a substantial lost-motion connection to a stationary part of the molding machine, said unscrewing device including a sun gear coaxial with the gate, planet gears around said sun gear coaxial with the cores, the shaft of said sun gear being hollow to receive an ejector pin, the shafts of said planet gears being hollow and keyed to receive the slotted ends of the cores, and a gear meshing with the aforesaid rack and coupled by appropriate bevel gearing to the sun gear, whereby opening of the die unscrews the cores, the lost motion of the rack being adequate to permit breakage of the gate at the nozzle and partial opening of the die before the cores being to unscrew.

15. A molding machine comprising a cover die, a movable die plate, an ejector die carried thereby, unscrewing mechanism housed in a housing having extensive flat faces, said housing being disposed between the ejector die and the movable die plate for bodily movement therewith as a unit, a plurality of threaded cores carried by said ejector die, each core being threaded at its outer end to act as a molding surface, and slotted at its inner end for cooperation with a driving key, a thread on each core intermediate its ends and cooperating with a mating thread in the ejector die, said intermediate thread having the same pitch as the thread to be molded, said cores and mating threads forming a part of the mold separable from said uncrewing mechanism, whereby the latter may be used with any one of a plurality of molds, said unscrewing mechanism including a plurality of hollow shafts rotatably carried in said housing and keyed to receive the slotted ends of the cores, gearing in said housing interconnecting said shafts for simultaneous rotation, and means responsive to movement of the movable die plate for rotating said gearing.

16. A molding machine comprising a cover die, a movable die plate, an ejector die carried thereby, unscrewing mechanism housed in a housing having extensive flat faces, said housing being disposed between the ejector die and the movable die plate for bodily movement therewith as a unit, a plurality of mold cavities, a plurality of threaded cores carried by said ejector die, each core being threaded at its outer end to act as a molding surface and slotted at its inner end for cooperation with a driving key, said cores forming part of the mold separable from said unscrewing mechanism, whereby the latter may be used with any one of a plurality of molds, said unscrewing mechanism including a sun gear, planet gears around said sun gear co-axial with the cores, the shafts of said planet gears being hollow and keyed to receive the slotted ends of the cores, all of said gears being rotatably carried in said housing, and means for rotating the sun gear.

17. A molding machine comprising a cover die, a movable die plate, an ejector die carried thereby, unscrewing mechanism housed in a housing having extensive flat faces, said housing being disposed between the ejector die and the movable die plate for bodily movement therewith as a unit, a plurality of mold cavities disposed radially around a gate, a plurality of threaded cores carried by said ejector die, each core being threaded at its outer end to act as a molding surface and slotted at its inner end for cooperation with a driving key, said cores forming part of the mold separable from said unscrewing mechanism, whereby the latter may be used with any one of a plurality of molds, said unscrewing mechanism including a sun gear co-axial with the gate, planet gears around said sun gear co-axial with the cores, the shaft of said sun gear being hollow to receive an ejector pin, the shafts of said planet gears being hollow and keyed to receive the slotted ends of the cores, all of said gears being rotatably carried in said housing, and means for rotating the sun gear.

18. A molding machine comprising a cover die, a movable die plate, an ejector die carried thereby, unscrewing mechanism housed in a housing having extensive flat faces, said housing being disposed between the ejector die and the movable die plate for bodily movement therewith as a unit, a plurality of mold cavities disposed radially around a gate, a plurality of threaded cores carried by said ejector die, each core being threaded at its outer end to act as a threaded molding surface and slotted at its inner end for cooperation with a driving key, a thread on each core intermediate its ends and cooperating with a mating thread in the ejector die, said intermediate thread having the same pitch as the thread to be molded, said cores and mating threads forming part of the mold separable from said unscrewing mechanism, whereby the latter may be used with any one of a plurality of molds, said unscrewing mechanism including a sun gear co-axial with the gate, planet gears around said sun gear co-axial with the cores, the shaft of said sun gear being hollow to receive an ejector pin, the shafts of said planet gears being hollow and keyed to receive the slotted ends of the cores, all of said gears being rotatably carried in said housing, and means for rotating the sun gear.

19. In combination, a molding press having a stationary part, a cover die, a movable die, a core rotatably and axially movable in the movable die, said core having a threaded molding surface, a thread on said core intermediate its ends and cooperating with a thread in the die, the pitch of said intermediate thread being the same as the pitch of the thread to be molded, and means connected between the stationary part of the press and the movable die and so arranged that movement of the movable die relative to the stationary part of the press causes rotation of said core, whereby the movement of the movable die itself acts as the driving force for unscrewing the core from the molded piece as the die opens.

20. In combination, a molding press having a stationary part, a cover die, a movable die, a core rotatably and axially movable in the movable die, said core having a threaded molding surface, a thread on said core intermediate its ends and cooperating with a thread in the die, the pitch of said intermediate thread being the same as the pitch of the thread to be molded, mechanism connected between the stationary part of the press and the movable die and so arranged that movement of the movable die relative to the stationary part of the press causes rotation of said core, whereby the movement of the movable die itself acts as the driving force for unscrewing the core from the molded piece as the die opens, and a lost motion connection in the aforesaid mechanism to cause lost motion in the operation of said mechanism in order to permit initial opening of the die before the core begins to unscrew.

21. A mold and unscrewing device for use in a casting machine to produce a threaded article, said mold including a cover die and an ejector die, said ejector die having an open gate passage opening on its parting face, said ejector die also having an open shallow key passage opening on its parting face, said passages communicating with the cavity with a small connection in order to facilitate subsequent separation of the excess molding material from the molded article, said ejector die further including a rotatable and axially movable threaded part having an additional master thread of identical pitch, and means to rotate said threaded part while affording axial movement of the same, said gate and key passages receiving molding material which prevents rotation of the molded article, whereby after opening the mold the molded article is prevented from rotating and is prevented from moving out of the ejector die during rotation of the threaded part.

22. A mold and unscrewing device for use in a casting machine to produce threaded articles, said mold including a cover die and an ejector die, said cover die having a main central gate passage, said ejector die having open gate passages opening on the parting face and extending to a plurality of mold cavities, and having on the opposite sides of the mold cavities additional open shallow key passages opening on the parting face, said key passages communicating with the cavities with a small connection in order to facilitate subsequent separation of the excess molding material from the molded articles, said ejector die further including a rotatable and axially movable threaded part having an additional master thread of identical pitch, and means to rotate said threaded part while affording axial movement of the same, said gate and key passages receiving molding material which prevents rotation of the molded articles, whereby after opening the mold the molded articles are prevented from moving out of the ejector die during rotation of the threaded part, and are prevented from rotating.

23. Casting apparatus comprising a cover die, an ejector die, an ejector pin for said ejector die, a rotatable and axially movable threaded core for said ejector die, said core having a master thread with the same pitch as the core thread, said ejector die having open shallow key passages opening on the parting face to receive molding material which prevents rotation of the molded piece while it remains in the ejector die, said key passages communicating with the cavity with small connections in order to facilitate subsequent separation of the excess molding material from the molded piece, and operating means to operate the aforesaid parts in such sequence that the ejector die is moved without the cover die, following which the core is rotated and moved axially in order to strip the core from the molded piece, while preventing rotation of the molded piece and axial movement of the molded piece out of the ejector die, following which the ejector pin is operated to eject the molded piece from the ejector die.

24. Casting apparatus comprising a nozzle, a cover die, an ejector die, an ejector pin for said ejector die, a rotatable and axially movable threaded core for said ejector die, said core having a master thread with the same pitch as the core thread, said ejector die having an open gate passage and an opposite open shallow key passage opening on its parting face to receive molding material which prevents rotation of the molded piece while it remains in the ejector die, said passages communicating with the cavity with connections which facilitate subsequent separation of the excess molding material from the molded piece, and operating means to operate the aforesaid parts in such sequence that the entire die is first moved slightly to break the gate at the nozzle, following which the movement of the ejector die is continued but without the cover die in order to strip the molded piece from the cover die, following which the core is rotated and moved axially in order to strip the core from the molded piece while preventing rotation of the molded piece and axial movement of the molded piece out of the ejector die, following which the ejector pin is operated to eject the molded piece from the ejector die.

GORDON B. SAYRE.